(12) United States Patent
Smith et al.

(10) Patent No.: US 7,862,282 B2
(45) Date of Patent: Jan. 4, 2011

(54) SEPARATION FASTENER WITH SEGMENTED WASHER

(75) Inventors: Bradley W. Smith, Plain City, UT (US); Michael P. Jordan, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 202 days.

(21) Appl. No.: 12/178,890

(22) Filed: Jul. 24, 2008

(65) Prior Publication Data

US 2010/0021264 A1 Jan. 28, 2010

(51) Int. Cl.
F16B 37/08 (2006.01)

(52) U.S. Cl. ...................................... 411/434; 411/433

(58) Field of Classification Search ......... 411/432–434, 411/519, 532, 539, 540, 943
See application file for complete search history.

(56) References Cited

U.S. PATENT DOCUMENTS

| | | | |
|---|---|---|---|
| 3,120,149 A | 2/1964 | Dickie | |
| 3,147,663 A * | 9/1964 | Brown | 411/434 |
| 3,170,363 A | 2/1965 | Dickie | |
| 3,262,351 A * | 7/1966 | Webb | 411/434 |
| 3,268,928 A | 8/1966 | Dickie | |
| 3,331,278 A | 7/1967 | Brown | |
| 3,926,090 A | 12/1975 | Bunker | |
| 4,410,293 A | 10/1983 | Elias et al. | |
| 4,929,135 A | 5/1990 | Delarue et al. | |
| 5,671,650 A | 9/1997 | Aubret | |
| 7,001,127 B2 | 2/2006 | Tuszynski | |

FOREIGN PATENT DOCUMENTS

| | | |
|---|---|---|
| EP | 1 705 389 A2 | 9/2006 |
| JP | 2007-030560 | 9/2007 |

* cited by examiner

*Primary Examiner*—Gary Estremsky
(74) *Attorney, Agent, or Firm*—Sally J Brown; Harness Dickey & Pierce LLP

(57) ABSTRACT

A separation fastener assembly including a base and a housing positioned adjacent the base. A nut is disposed in the cavity. A bolt extends through an aperture in the base and including an end coupled to the nut. A washer is positioned proximate the nut and operative to retain the nut within the housing. The washer includes a plurality of segments. An actuator is carried by the housing and is in communication with the cavity. The actuator is operative to displace the housing relative to the washer from a first position radially retaining plurality of segments of the washer and retaining the nut in the cavity to a second position permitting radial expansion of the plurality of segments and permitting withdrawal of the nut from the housing.

19 Claims, 12 Drawing Sheets

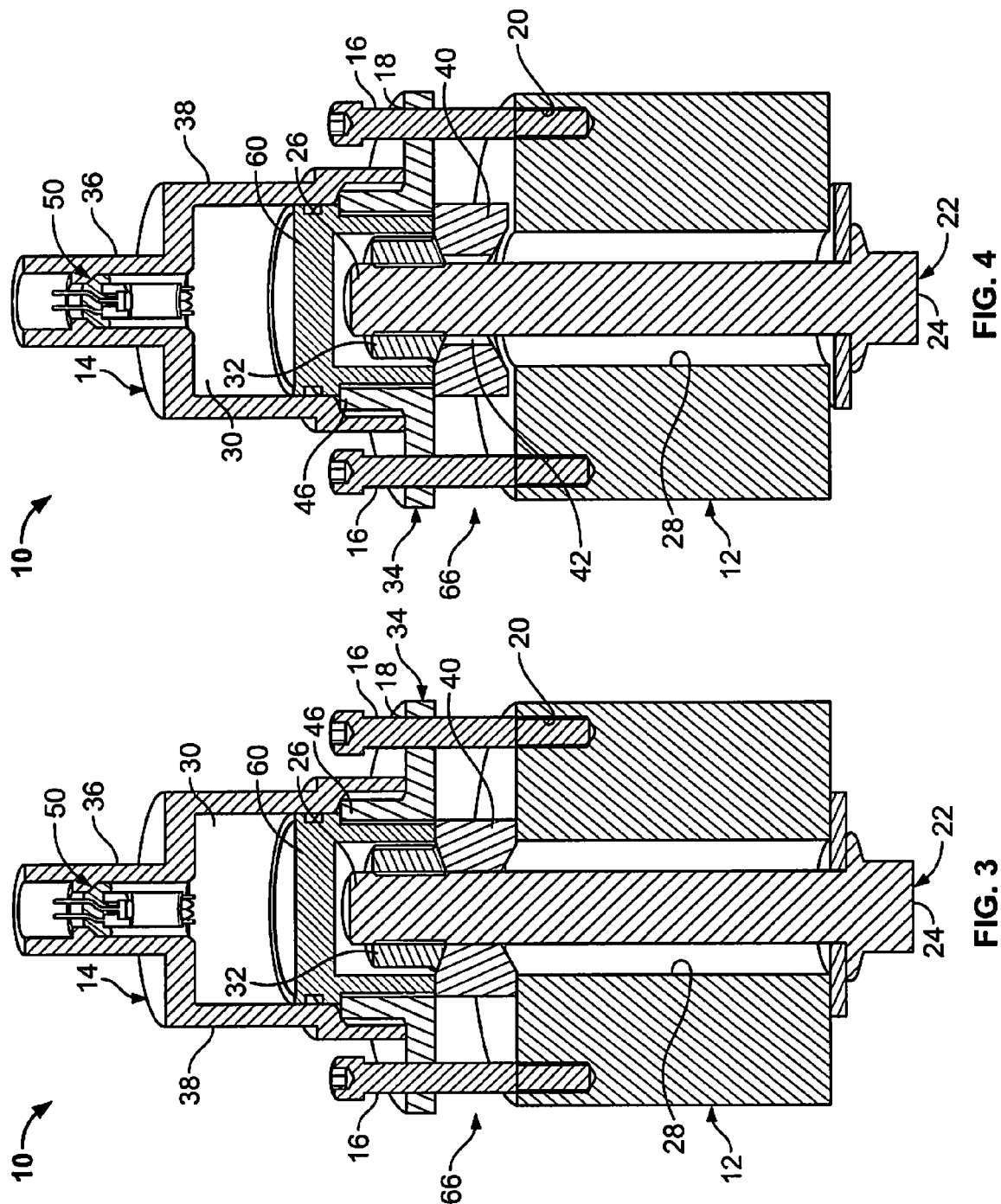

US 7,862,282 B2

SEPARATION FASTENER WITH SEGMENTED WASHER

FIELD

The present disclosure generally relates to separation fastener assemblies. More particularly, the present disclosure relates to a separation fastener assembly with a segmented washer.

BACKGROUND

The statements in this section merely provide background information related to the present disclosure and may not constitute prior art.

Separation fastener assemblies have been used for various applications and are generally responsive to a signal for releasing secured components. One type of separation fastener includes a pyrotechnic charge that is detonated to fragment the bolt or nut and release the components. Another type of separation fastener may include a nut having a plurality of discrete segments. The discrete segments are arranged within the fastener assembly to normally retain a bolt. When the separation fastener assembly is pyrotechnically actuated, these discrete nut segments move outward in response to the forces generated by the actuation of the charge and the axial load on the bolt. As a result, the bolt is released.

While known separation fasteners may have proven suitable for their intended applications, a continuous need in the pertinent art remains.

SUMMARY

According to one particular aspect, the present teachings provide a separation fastener assembly include a housing definite a cavity and a nut is disposed in the cavity. A bolt includes an end coupled to the nut. A washer is positioned proximate the nut and operative to retain the nut within the housing. The washer includes a plurality of segments. An actuator is carried by the housing and is in communication with the cavity. The actuator is operative to displace the housing from a first position radially retaining the plurality of segments of the washer and retaining the nut in the cavity to a second position permitting radial expansion of the plurality of segments and thereby permitting withdrawal of the nut from the housing.

According to another particular aspect, the present teachings provide a separation fastener assembly including a housing defining a cavity. A nut is disposed in the housing and a bolt includes an end coupled to the nut. A washer is positioned proximate the nut and is operative to retain the nut within the housing. A movable element is movable from a first position in which the washer is restrained from radial expansion to a second position in which the washer is permitted to radially expand.

According to a further particular aspect, the present teachings provide a separation fastener assembly including a housing defining a cavity and a nut disposed in the cavity. A bolt has an end extending into the cavity that is coupled to the nut. A washer is positioned proximate the nut and operative to retain the nut within the housing. The washer includes a plurality of discrete segments. A retainer retains the discrete segments of the washer from radial displacement. A pyrotechnic charge is carried by the housing and is operative to pressurize a portion of the cavity in response to a signal and remove the restraint of the retainer from the washer to permit radial displacement of the discrete segments.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 2-6 represent a series of cross-sectional views similar to FIG. 1, the series progressively illustrating the separation fastener assembly during activation of the pyrotechnic charge.

DESCRIPTION OF VARIOUS ASPECTS

Figure 1:
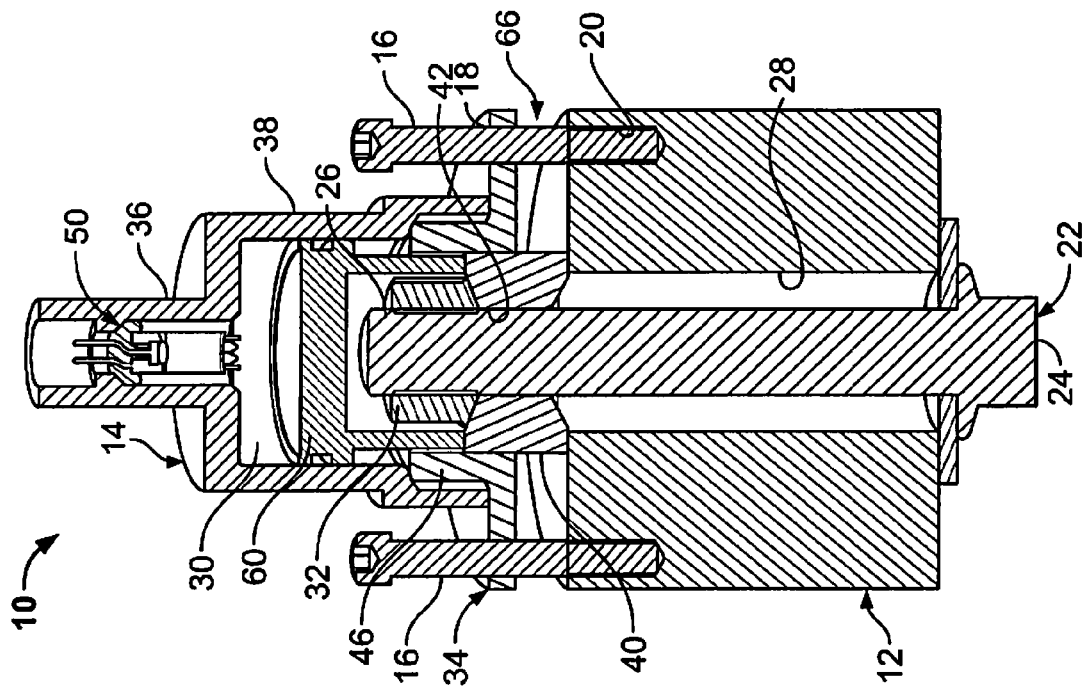
FIG. 1 is a cross-sectional view of a separation fastener assembly in accordance with the teachings of the present disclosure, the separation fastener assembly shown drawn to scale and prior to activation of the pyrotechnic charge.
Figure 2:
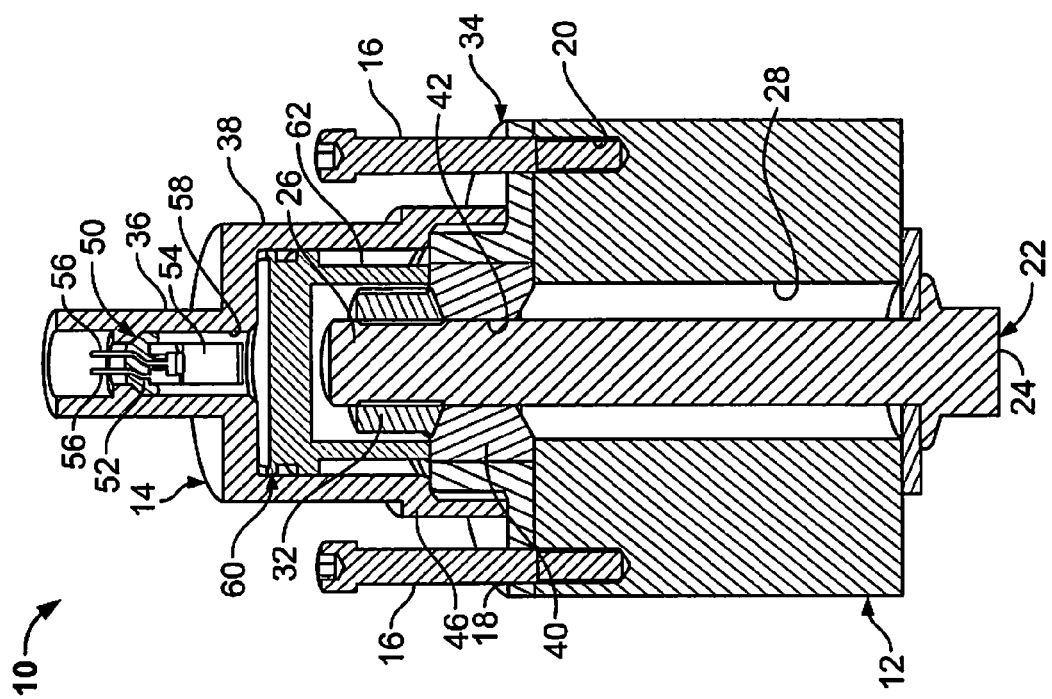
Figure 5:
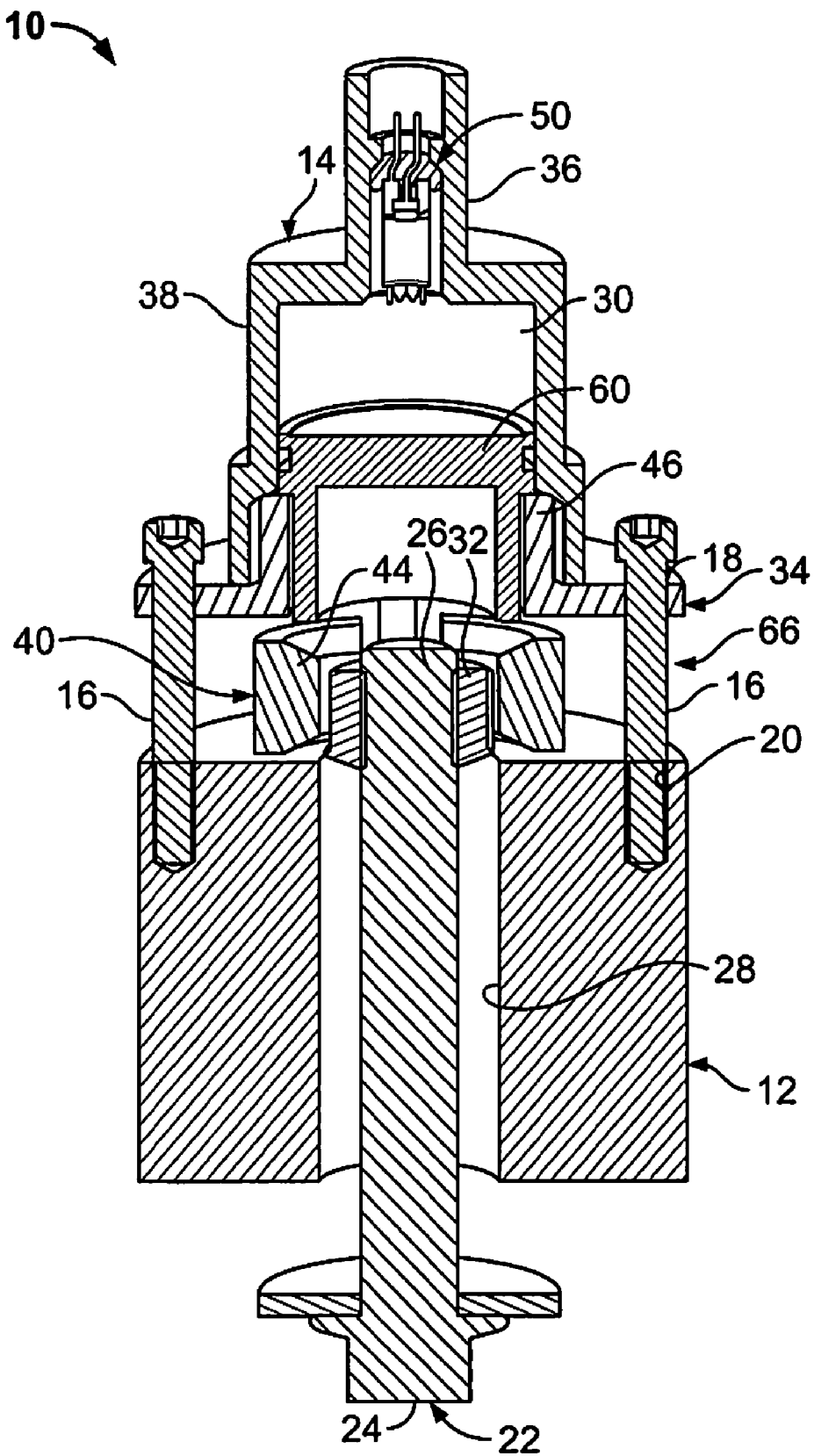
Figure 6:
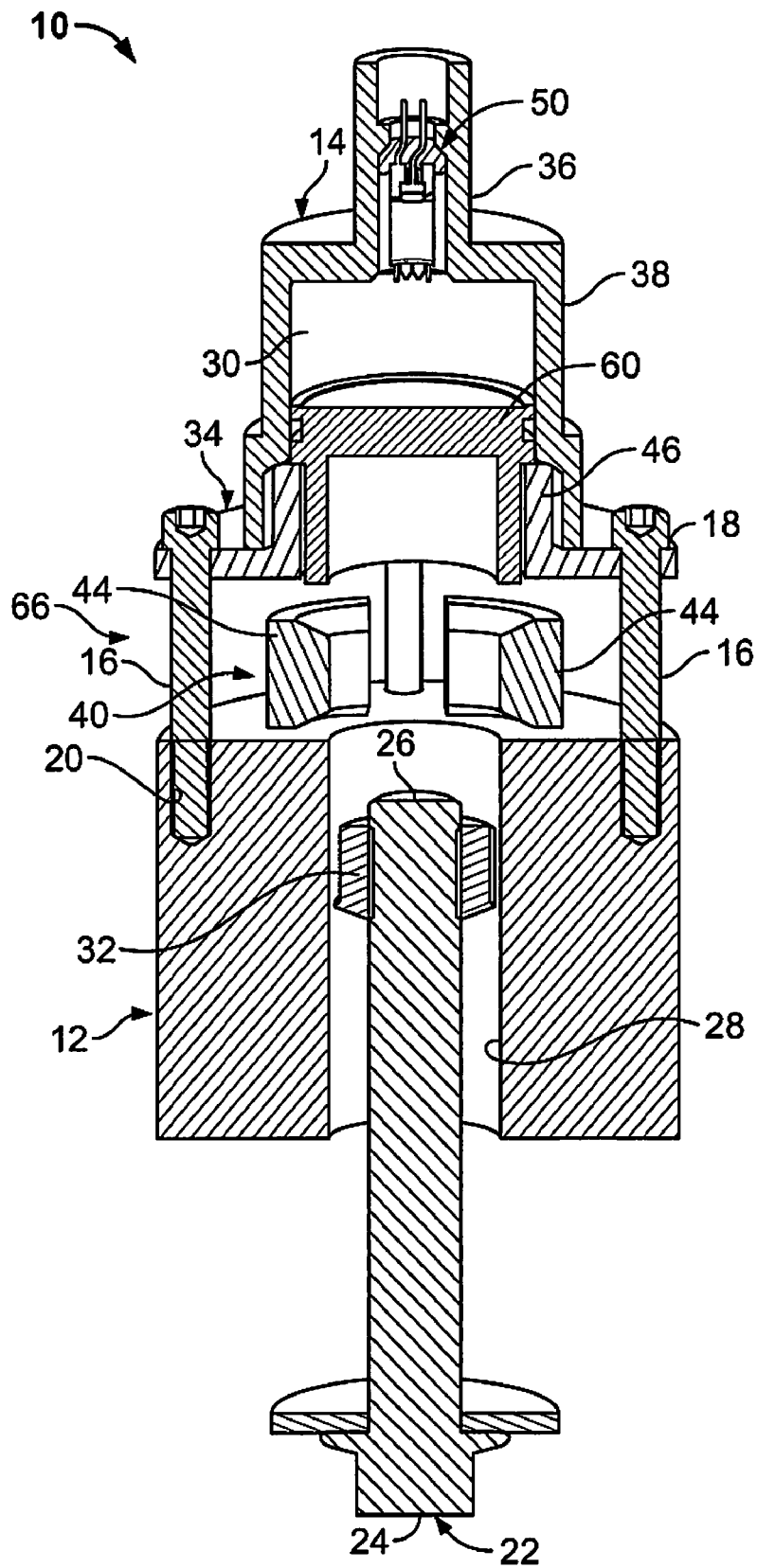
Figure 7:
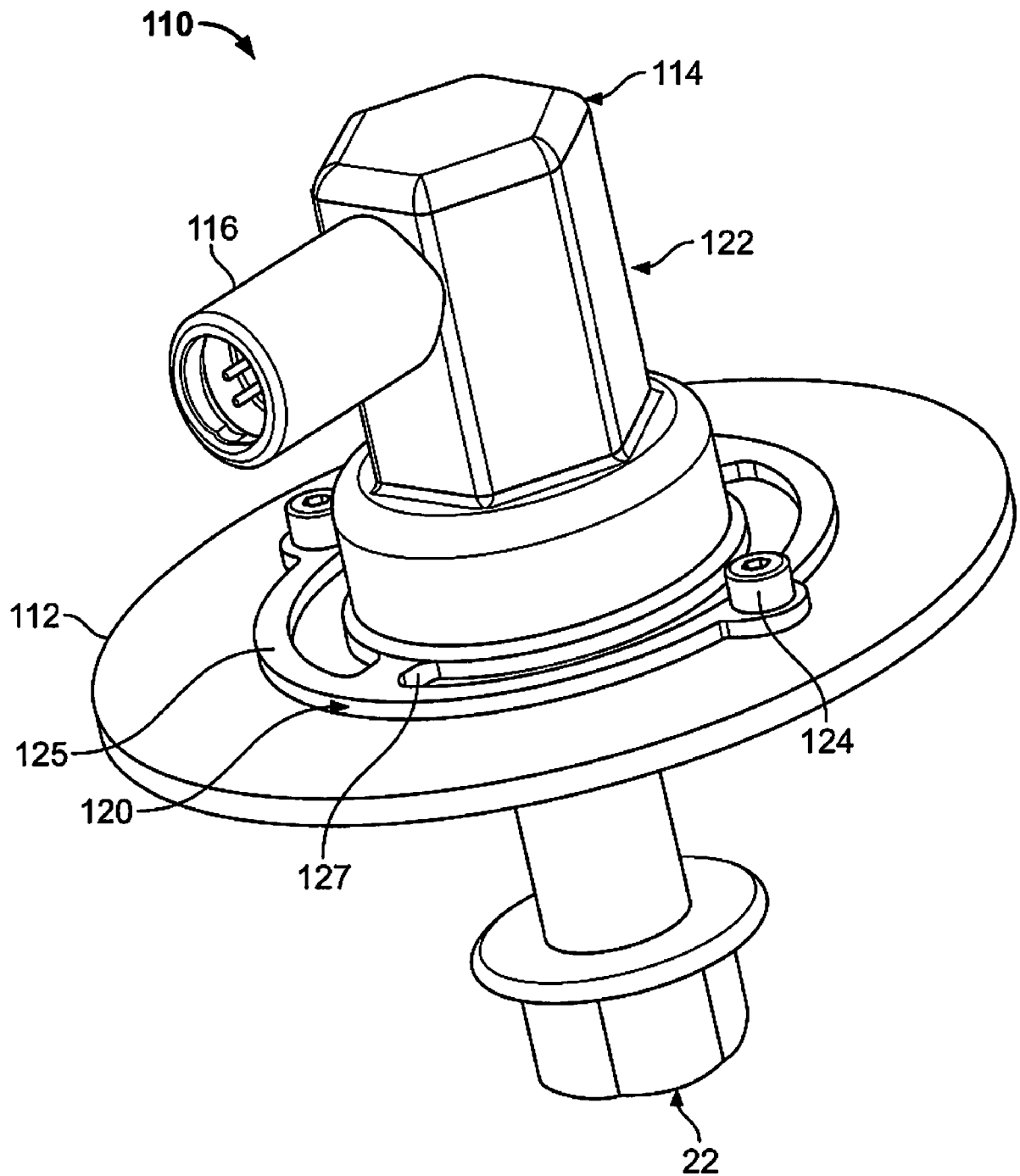
FIG. 7 is perspective view of another separation fastener assembly in accordance with the teachings of the present disclosure, the separation fastener assembly shown drawn to scale and prior to activation of the pyrotechnic charge.
Figure 8:
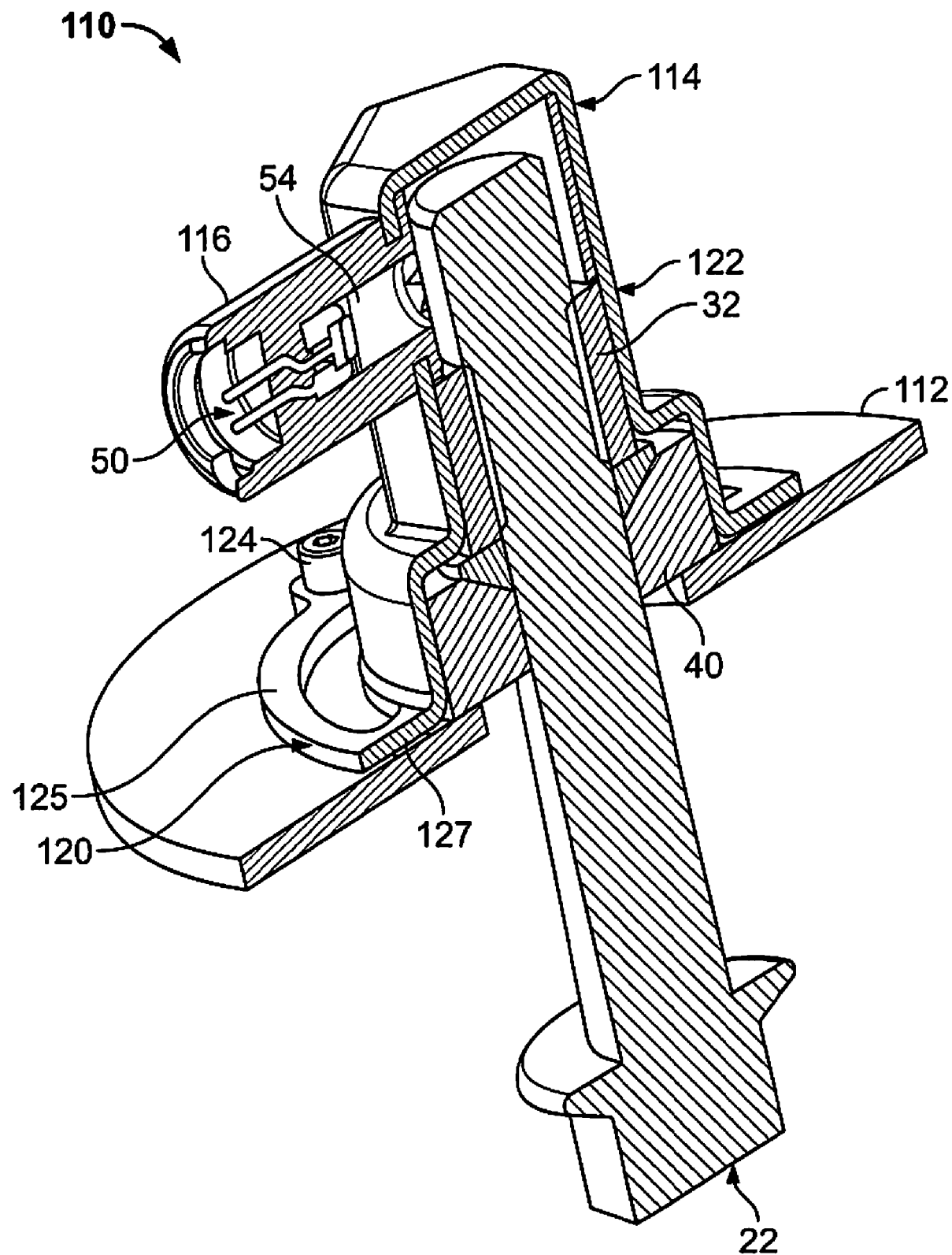
FIG. 8 is a cross-sectional view of the separation fastener assembly of FIG. 7.
Figure 9:
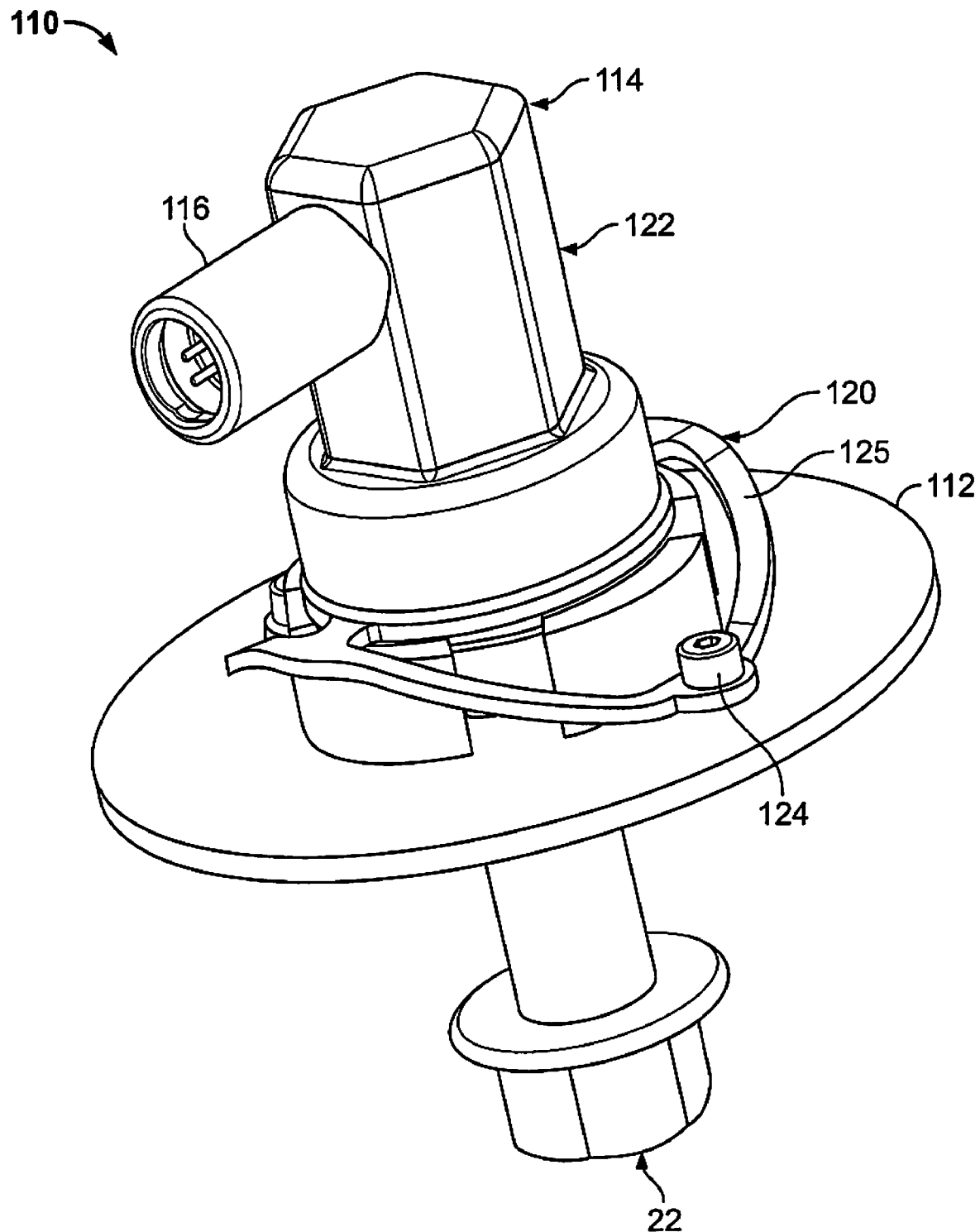
FIG. 9 is a perspective view similar to FIG. 7, the separation fastener assembly shown after activation of the pyrotechnic charge.
Figure 10:
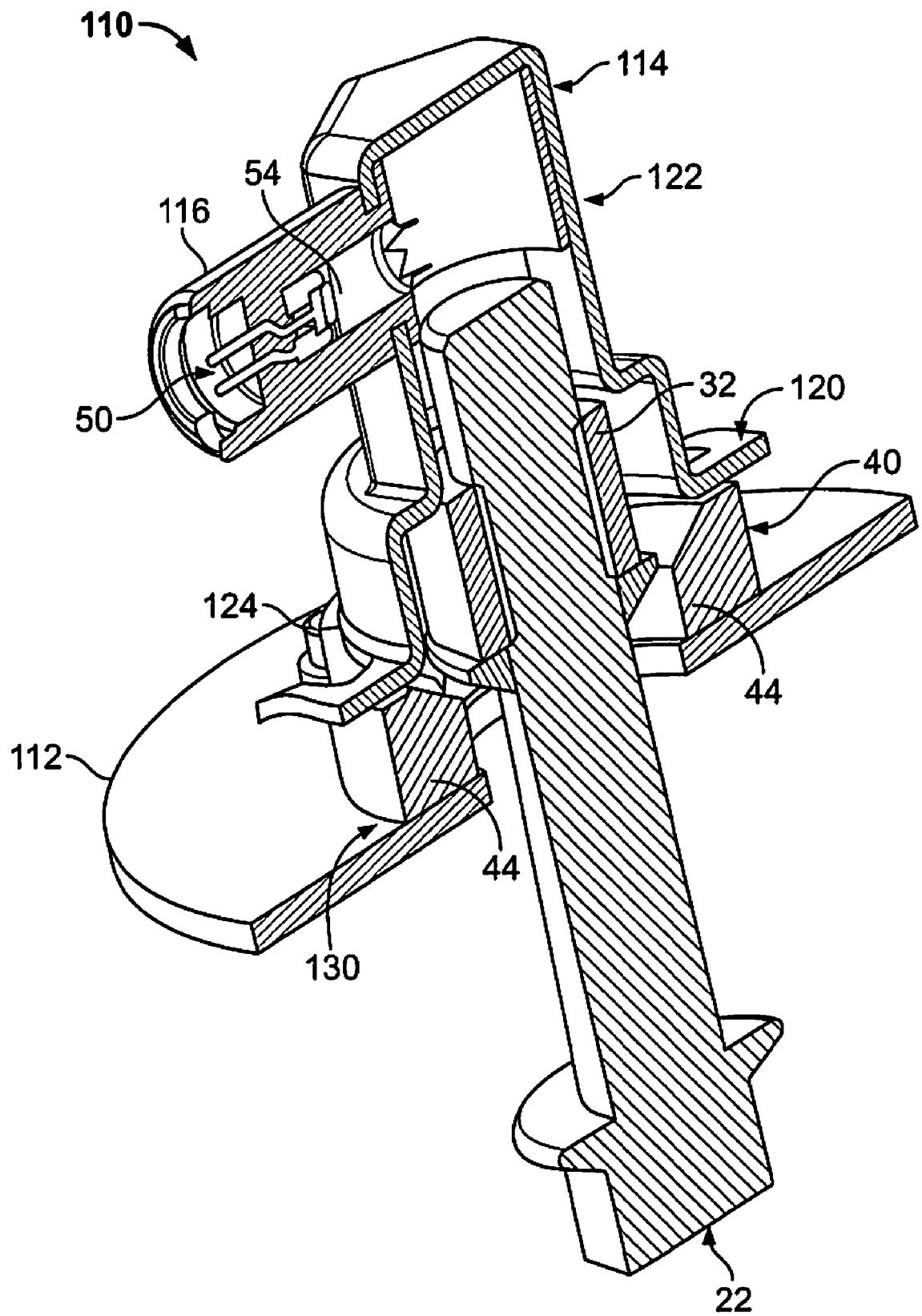
FIG. 10 is a cross-sectional of the separation fastener assembly as shown in FIG. 9.
Figure 11:
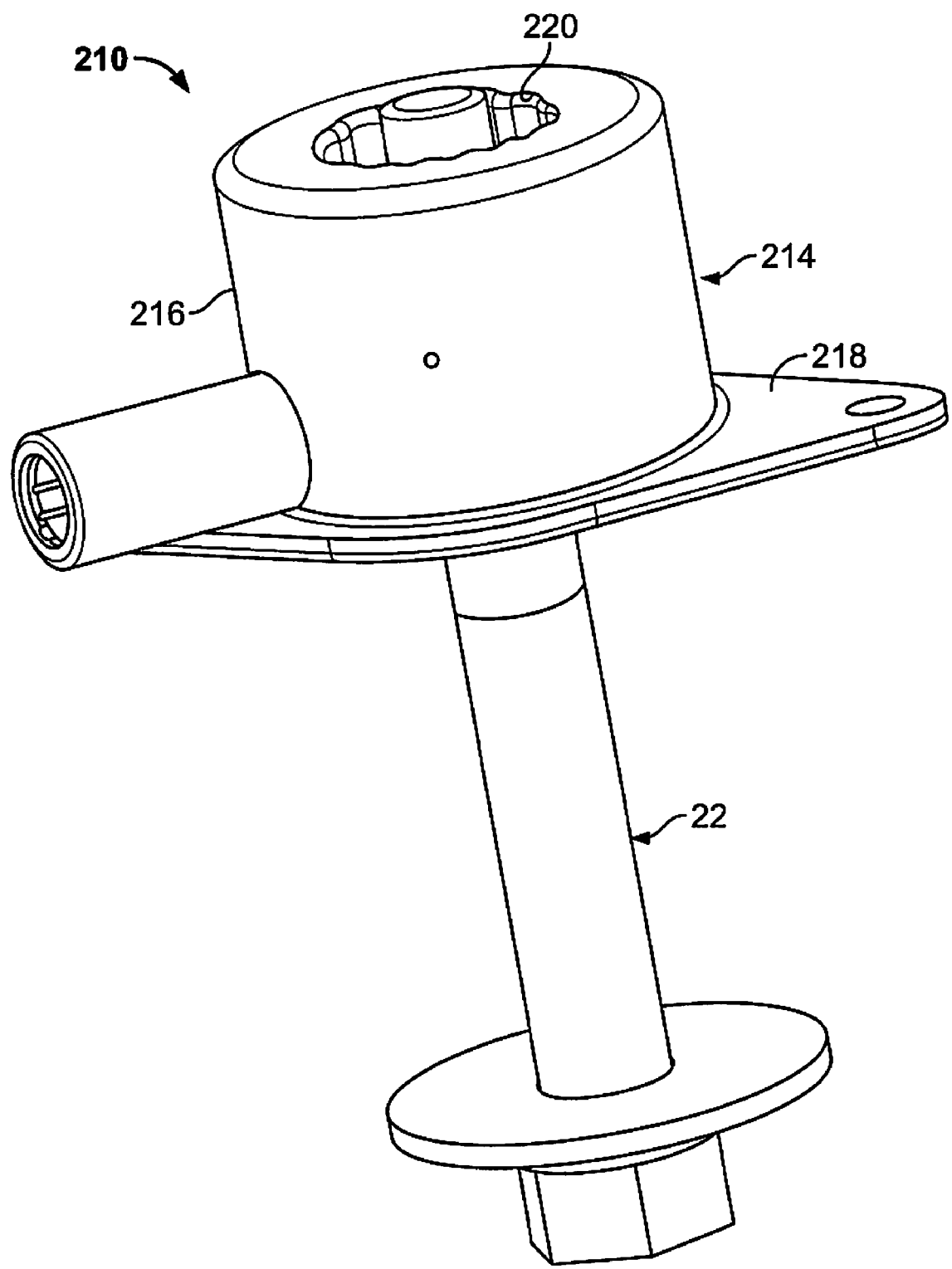
FIG. 11 is perspective view of another separation fastener assembly in accordance with the teachings of the present disclosure, the separation fastener assembly shown drawn to scale and prior to activation of the pyrotechnic charge.
Figure 12:
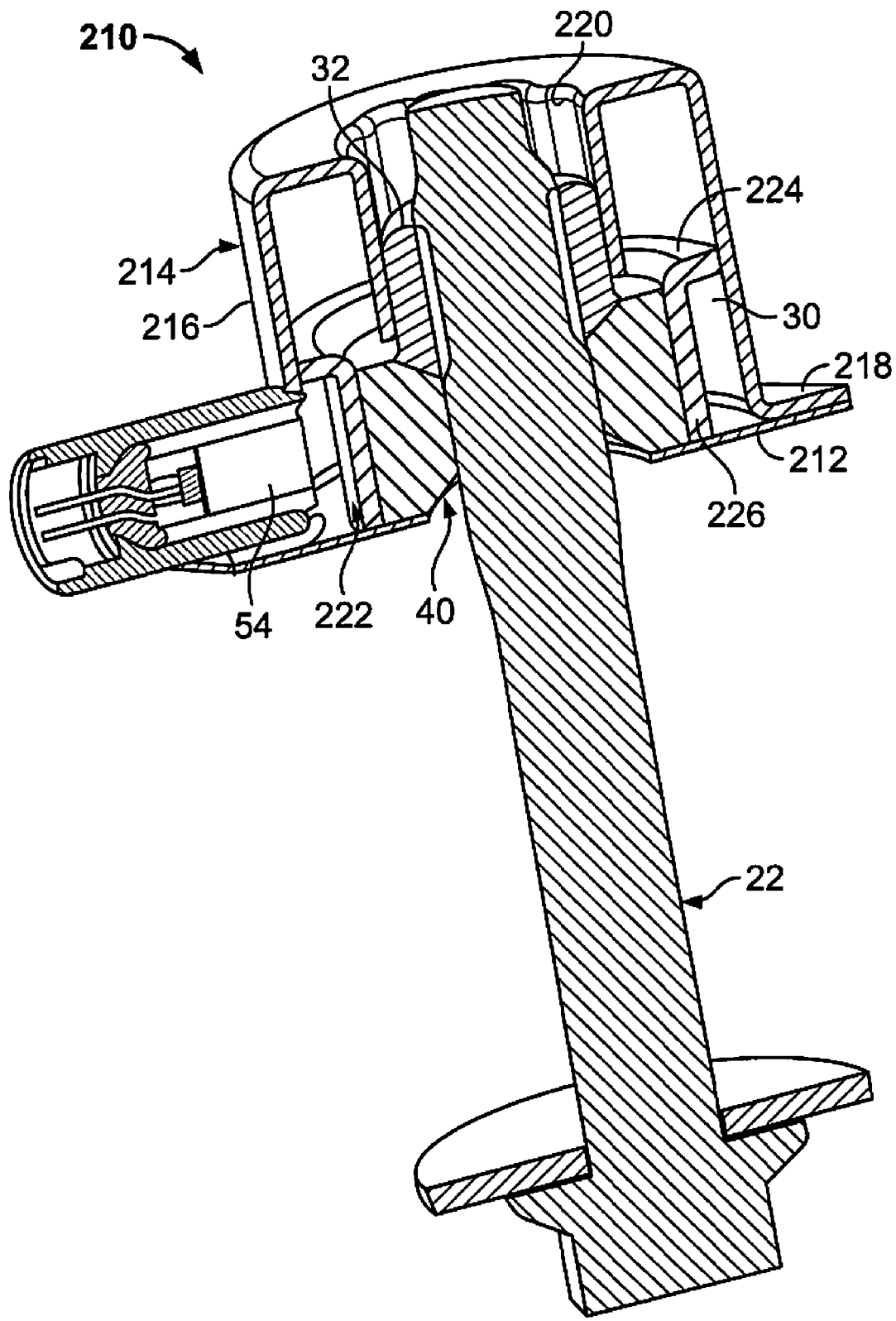
FIG. 12 is a cross-sectional view of the separation fastener assembly as shown in FIG. 11.
Figure 13:
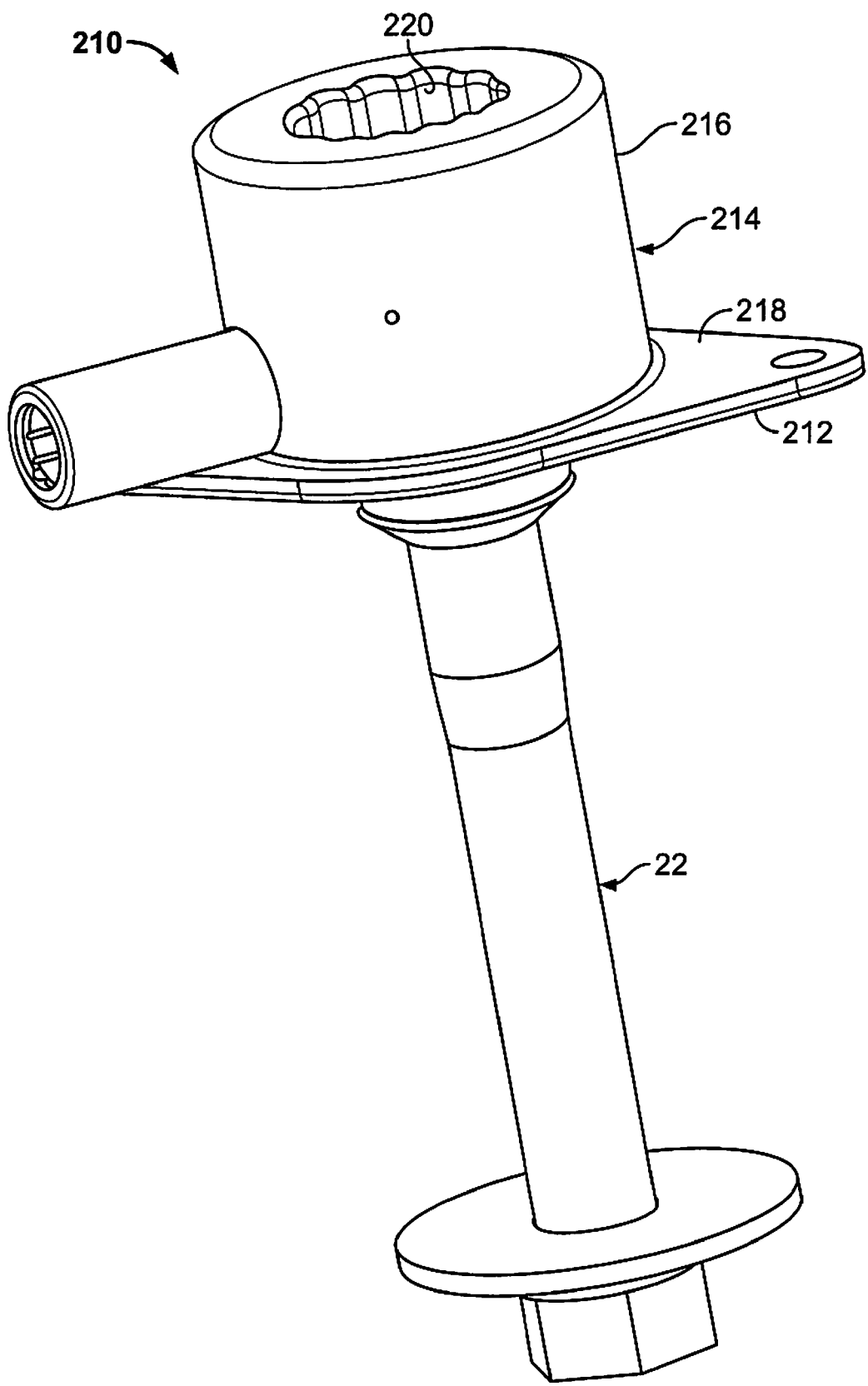
FIG. 13 is a perspective view similar to FIG. 11, the separation fastener assembly shown after activation of the pyrotechnic charge.
Figure 14:
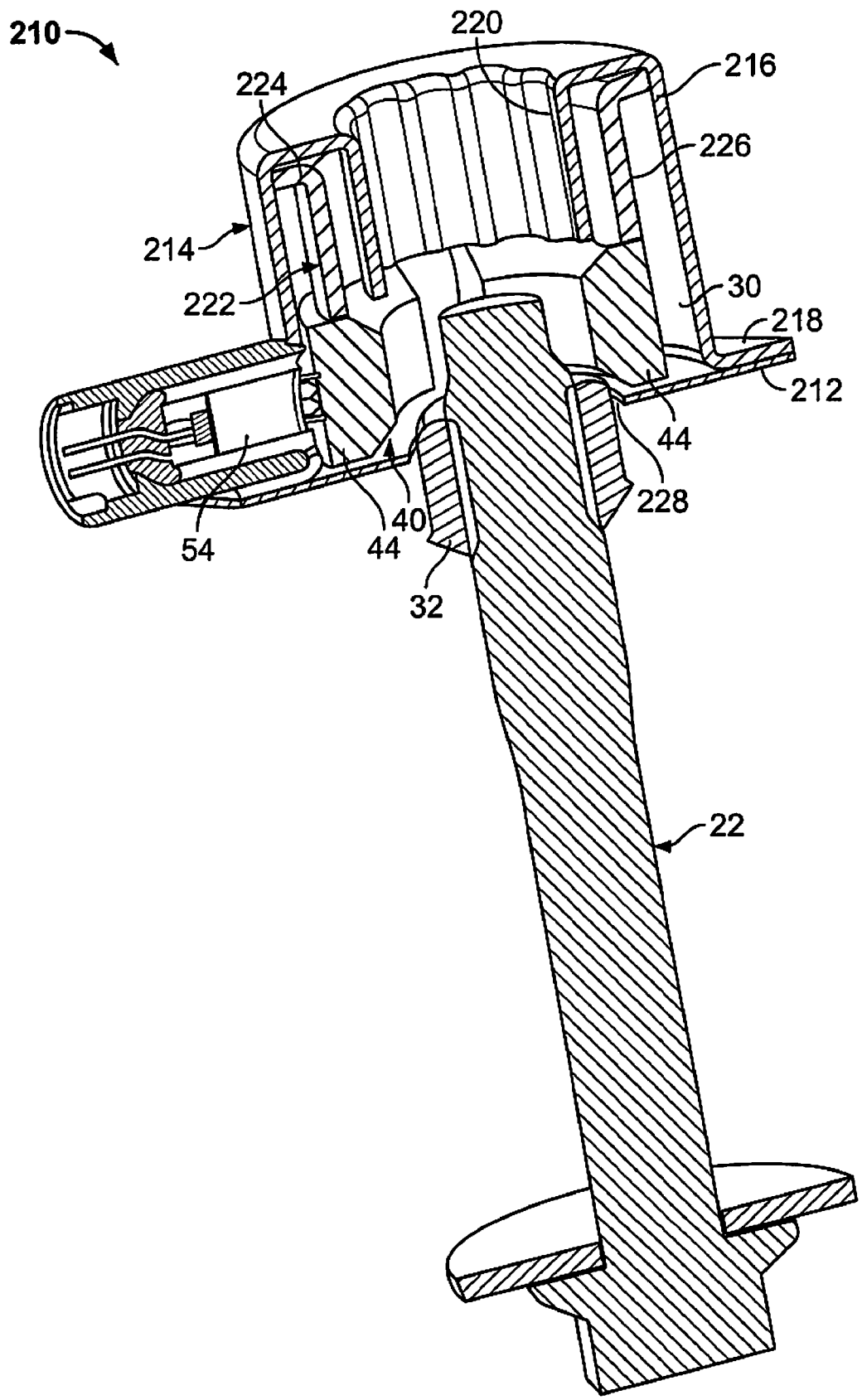
FIG. 14 is a cross-sectional view of the separation fastener assembly as shown in FIG. 13.

The following description is merely exemplary in nature and is not intended to limit the present disclosure, application, or uses. It should be understood that throughout the drawings, corresponding reference numerals indicate like or corresponding parts and features.

With initial reference to the FIGS. 1 through 6 of the drawings, a separation fastener assembly in accordance with the present teachings is illustrated and generally identified at reference character 10. The separation fastener assembly 10 may be used to release secured components in response to a predetermined event. For example, the separation fastener assembly 10 may be used to secure select components of a motor vehicle frame and release the components upon sensing of an impending vehicle collision. It will be understood, however, that the present teachings have application beyond this exemplary use.

The separation fastener assembly 10 is shown prior to release in FIG. 1. FIGS. 2-6 progressively illustrate the separation fastener assembly 10 through release. The separation fastener assembly 10 is illustrated to generally include a base 12 and a housing 14. The base 12 may comprise a plate, a block or other structure. Prior to release of the separation fastener assembly 10, the housing 14 may be positioned proximate to or adjacent the base 12.

A plurality of fasteners 16 interconnect the housing 14 with the base 12 such that the housing 14 may be displaced relative to the base 12 in a manner addressed below. The fasteners 16 may comprise pins extending through apertures 18 of the housing 14. The fasteners 16 may threadably engage internally threaded bores 20 defined by the base 12.

A separation fastener assembly 10 further includes a bolt 22. The bolt 22 includes a head 24 and an opposite distal end 26. The bolt 22 extends through an aperture or bore 28 in the base 12 and the end 26 is disposed within a cavity 30 defined by the housing 14. The end 26 may be coupled to a nut 32 disposed within the cavity 30. As illustrated, the end 26 may threadably engage the nut 32.

The housing 14 is illustrated to include a lower portion 34 and an upper portion 36. The lower and upper portions 34 and 36 may be welded or otherwise suitably joined. Alternatively, the housing 14 may be formed of a single component. The housing 14 may include a cylindrical sidewall 38 or may be of any other suitable geometric configuration. Torque from the bolt 22 and nut 32 upon assembly may be reacted by the housing 14.

The separation fastener assembly 10 may further include a washer 40. The washer 40 may be positioned proximate the nut 32 and may be generally operative to retain the nut 32 within the housing 14. The washer 40 may define a central opening 42 for receiving the bolt 22 and may be positioned adjacent the base 12.

The washer 40 may include a plurality of segments 44. The plurality of segments 44 may be a plurality of discrete segments. Alternatively, the plurality of segments 44 may be connected to one another through fracture lines such that the washer 40 is a frangible washer. The housing 14 operates to normally retain the segments 44 of the washer 40 from radial expansion. In the particular embodiment illustrated, the lower portion 34 of the housing 14 includes an upwardly extending flange 46 sized to receive the washer 40 and retain the washer 40 from radial expansion.

The separation fastener assembly 10 further includes an actuator 50 carried by the housing 14. The actuator 50 is in communication with the cavity 30 and is operative to displace the washer 40 from a first position (shown in FIG. 1, for example) to a second position (shown in FIG. 6, for example). In the first position, the segments 44 of the washer 40 are retained from radially expansion. The nut 32 is thereby retained in the cavity 30. In the second position, radial expansion of the segments 44 of the washer 40 is permitted and the nut 32, along with the end 26 of the bolt 22, may be withdrawn from the housing 14.

The nut 32 and the washer 40 may include cooperating faces or surfaces for radially displacing the segments 44 of the washer 40 in response to a generally axial load on the bolt 22. As shown in the drawings, the upper faces or surfaces of the segments 44 of the washer 40 may taper inwardly and downwardly. In a generally mating fashion, cooperating lower faces or surfaces of the nut 32 may downwardly taper. In this manner, a force generally along the axis of the bolt 22 may transmit a generally radially directed component from the nut 32 to the segments 44 of the washer 40 for radially expanding the washer 40. The upper and lower faces of the washer 40 may be substantially identical such that the orientation of the washer 40 relative to the nut is not critical. In this regard, the upper and lower faces of the washer 40 may matingly and selectively abut the nut 32. In certain applications, the upper and lower surfaces may be oriented at an angle relative to a longitudinal axis of the bolt 14 of approximately 40 degrees to approximately 80 degrees. In the embodiment illustrated, this angle may be approximately 60 degrees.

The actuator 50 may comprise a pyrotechnic initiator. The initiator 50 may include any suitable initiator. One suitable initiator is shown and described in commonly assigned U.S. Pat. No. 7,210,703, which is hereby incorporated by reference in its entirety. As such, the exemplary initiator 50 will not be discussed in detail herein. Briefly, however, the initiator 50 may include a body 52, a pyrotechnic charge 54, a pair of conductive pins 56 and a bridgewire (not specifically shown). The initiator 50 can produce a pressurization or ignition charge upon receipt of a signal, such as an electrical current, as will be discussed. The reactive charge 54 may be in communication with the cavity 30 through an input port 58. The reactive charge 54 may be in communication with and responsive to the initiator 50 to ignite upon receipt of an electrical impulse from the pins 56 and thereby pressurize a portion of cavity 30 with the combustion products thereof.

The bridgewire can connect the conductive pins 56. Upon receipt of a signal, an electrical current may be introduced to the pins 56. The signal may be indicative of an impending collision or other vehicle event in which release of the components secured by the separation fastener assembly 10 is desired, for example. The introduction of the electric current may cause the initiator 50 to fire, and produce an ignition pulse, which in turn, can ignite the reactive charge 54 which combusts to form hot, gaseous combustion products or release energy for pressurizing the portion of the cavity 30. Sensing of the vehicle event and the transmission of the corresponding signal to the actuator 50 will be understood to be conventional insofar as the present teachings are concerned.

The separation fastener assembly 10 may further include a movable element 60. The movable element 60 may be disposed in the cavity 30 of the housing 14 and may be movable, relative to housing 14, between a first position (shown in FIG. 1, for example) and a second position (shown in FIG. 6, for example). In the first position, the washer 40 is restrained from radial expansion. In the second position, the housing 14 has been lifted above the washer 40, thereby permitting the segments 44 of washer 40 to radially expand.

The movable element 60 may comprise a piston. The piston 60 may include one or more downwardly extending legs, a cylindrical flange 62 or similar structure for abutting one or more segments 44 of the washer. Alternatively, the piston 60 may abut the end 26 of the bolt 22 or the nut 32. An o-ring (not shown) may be disposed between the movable element 60 and the sidewall 38.

With continued reference to FIGS. 1 through 6, operation of the separation fastener assembly 10 will be described. Upon initiation of the reactive charge 54, a portion of the cavity 30 is pressurized. In the embodiment illustrated, initiation of the reactive charge 54 pressurizes an upper portion of the cavity 30 and results in upward translation of the housing 14 relative to piston 60 within the cavity 30. This upward translation of the housing 14 results in separation from the base 12 and the housing 14 at a separation plane.

The housing 14 is permitted to translate along unthreaded portions of the shafts of the fasteners 16. A gap 66 is created between the base 12 and the housing 14. When the height of the gap 66 is greater than the height of the segments 44 of the washer 40, the segments 44 are no longer radially restrained by the cylindrical flange 46 of the housing 14 and may be radially expanded through engagement of the cooperating surfaces of the washer 40 and nut 32. The generally axial force on the bolt 22 may withdraw the nut 32 and the first end 26 of the bolt 22 into the bore 28 defined by the base 12. In this embodiment, the body 12 should be understood to be the generic representation of an item to be released. In practice, the body 12 may be two or more items secured by the bolt 22 and the separation fastener assembly 10.

Turning to FIGS. 7-10, another separation fastener assembly in accordance with the present teachings is illustrated and generally identified at reference character 110. Given the similarities between the separation fastener assembly 110 and the separation fastener assembly 10, like reference numerals will be used to identify similar elements throughout the drawings. The separation fastener assembly 110 generally includes a base 112 and a housing 114. The base 112 may be generally in the form of a plate. For clarity, the items secured by the bolt 22 and the separation fastener assembly 110 are not shown.

The housing 114 may be formed to include a mounting portion 120 and an upwardly extending portion 122. The mounting portion 120 may be secured to the base 112 with one or more fasteners 124. Alternatively, the mounting portion 120 may be welded or others suitably secured to the base 112. The mounting portion 124 may include an outer ring 125 interconnected to the upwardly extending portion 122 of the housing through one or more webs 127.

The housing 114 may include a lower portion sized to receive the washer 40. The lower portion may be generally cylindrical or of any other suitable shape. The upper portion of the housing may be sized to receive the nut 32. In the embodiment illustrated, the upper portion of the housing 114 may be generally hexagonal in cross section. In this manner, the housing 114 may react torque of the bolt 22 and nut 32 upon assembly. The housing 114 defines a cavity 30 in fluid communication with a pyrotechnic initiator 50. The initiator 50 is disposed in a radially extending extension 116 and is in fluid communication with the cavity 30.

As discussed above with respect to the separation fastener assembly 10, the reactive charge 54 of the initiator 50 of the separation fastener assembly 110 is operative to pressurize an upper portion of the cavity 30. As illustrated, the separation fastener assembly 110 does not include a distinct piston or movable element as does the separation fastener assembly 10. In this regard, the nut 32 may be toleranced so as to effectively function as the piston. Alternatively, an additional component may be incorporated for various applications.

In operation, the reactive charge 54 pressurizes an upper portion of the cavity 30 and thereby upwardly displaces housing 114 relative to the bolt 22 and nut 32. This upward displacement of the housing 114 causes the outer ring 125 and/or the webs 127 to deform such that the upwardly extending portion 122 of the housing 114 is upwardly displaced from the base plate 112. In this regard, the mounting portion 120 may inelastically deform. Displacement of the upper portion 122 of the housing 114 creates a gap 130 at a separation plane in the manner discussed above, clearance is provided between the housing 114 and the base 112 such that the nut 32 causes the segments 44 of the washer 40 to radially expand thereby allowing the bolt 22 and the nut 32 to be released.

Turning to FIGS. 11-14, another separation fastener assembly in accordance with the present teachings is illustrated and identified at reference character 210. Again, common reference numerals will be used to identify elements similar to those introduced above. For clarity, the items being clamped together between the bolt 22 and the separation fastener assembly 210 are not shown. The separation fastener assembly 210 differs from those described above in that a lower portion of the cavity 30 defined by the housing 14 is pressurized to release the bolt 22, for example. The separation fastener assembly 210 is shown prior to release in FIGS. 11 and 12 and after release in FIGS. 13 and 14.

A housing 214 of the separation fastener assembly 210 is illustrated to define a cavity 30 that is generally cylindrical in shape. The housing 214 includes an outer wall 216 which may be generally cylindrical and a lower mounting flange 218 for attachment to a plate or base 212. An inner wall 220 of the housing 214 may include a cross section for matingly receiving the nut 32. In this regard, the housing 214 may react the torque of the nut 32 and bolt 22 upon assembly. The inner wall 220 terminates above the washer 40.

The separation fastener assembly 210 may further include a movable element 222. The movable element may translate between a first position (shown in FIG. 12, for example) and a second position (shown in FIG. 14, for example). The movable element 222 may be a piston having an upper radially extending flange 224 effectively defining a seal against an inner side of the outer wall 216 of the housing 214. The piston 222 further includes a downwardly extending wall 226 that may be generally cylindrical in form that radially surrounds the washer 40. In the manner discussed above, the piston 222 normally functions to restraint the washer 40 from radial expansion.

Upon initiation of the reactive charge 54, a lower portion of the cavity 30 is pressurized. As a result, the piston 222 is upwardly translated within the cavity 30 from the first position to the second position. The segments 44 of the washer 40 are permitted to radially expand in a manner similar to that discussed above. A bore 228, in the base 212 may be large enough to permit the passage of released bolt 22 and nut 32.

It will now be appreciated that the present teachings provide certain advantages. These advantages include provisions of separation fasteners that do not rely on detonation to function. Further, the separation fasteners of the present teachings do not require a nut with a plurality of discrete segments that must be machined and oriented precisely to insure alignment of the threads of the segments.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A separation fastener assembly comprising:
a base;
a housing positioned adjacent the base, the housing defining a cavity;
a nut disposed in the cavity;
a bolt extending through an aperture in the base and including an end coupled to the nut;

a washer positioned proximate the nut and operative to retain the nut within the housing, the washer including a plurality of segments;

a retention member circumferentially surrounding the washer; and an actuator carried by the housing and in communication with the cavity, the actuator operative to displace the retention member from a first position radially retaining the plurality of segments of the washer and retaining the nut in the cavity to a second position permitting radial expansion of the plurality of segments and permitting withdrawal of the nut from the housing.

2. The separation fastener assembly of claim 1, wherein the plurality of segments is a plurality of discrete segments.

3. The separation fastener assembly of claim 2, wherein the fastener assembly normally retains the plurality of discrete segments from radial displacement relative to the bolt.

4. The separation fastener assembly of claim 2, wherein the nut and the washer include cooperating surfaces for radially displacing the discrete segments of the washer in response to a generally axial load on the bolt.

5. The separation fastener assembly of claim 2, wherein the washer includes substantially identical upper and lower faces for matingly and selectively engaging about the nut.

6. The separation fastener assembly of claim 5, wherein the cooperating surfaces of the washer are oriented relative to a longitudinal axis of the bolt of an angle between approximately 40 degrees and approximately 80 degrees.

7. The separation fastener assembly of claim 1, wherein the base defines a bore for allowing passage of the nut upon activation.

8. The separation fastener assembly of claim 1, wherein the retention member is a piston.

9. The separation fastener assembly of claim 8, wherein the actuator pressurizes a portion of the cavity to displace the piston.

10. A separation fastener assembly comprising:
a housing defining a cavity;
a nut disposed in the housing;
a bolt including an end coupled to the nut;
a washer position proximate the nut and operative to retain the nut within the housing; and
a movable element movable from a first position in which the washer is restrained from radial expansion to a second position in which the washer is permitted to radially expand.

11. The separation fastener assembly of claim 10, wherein the washer includes a plurality of discrete segments.

12. The separation fastener assembly of claim 11, wherein the washer is frangible into the plurality of discrete segments.

13. The separation fastener assembly of claim 12, wherein the washer includes substantially identical upper and lower faces for matingly and selectively engaging about the nut.

14. The separation fastener assembly of claim 10, wherein a portion of the cavity is pressurized to move the movable element from the first position to the second position.

15. The separation fastener assembly of claim 10, further comprising a pyrotechnic actuator for pressurizing the cavity.

16. The separation fastener assembly of claim 11, wherein the nut and the washer include cooperating surfaces for radially displacing the discrete segments of the washer in response to an axial load on the bolt.

17. The separation fastener assembly of claim 10, wherein the bolt includes a head opposite the end coupled to the nut and the movable element moves in a direction away from the head to permit radial expansion of the washer.

18. The separation fastener assembly of claim 10, wherein the movable element is a piston.

19. A separation fastener assembly comprising:
a housing defining a cavity;
a nut disposed in the cavity;
a bolt having an end extending into the cavity and coupled to the nut;
a washer positioned proximate the nut and operative to retain the nut within the housing, the washer being frangible into a plurality of discrete segments;
a retainer for retaining the discrete segments of the washer from radial displacement; and
a pyrotechnic charge carried by the housing and operative to pressurize a portion of the cavity in response to a signal and remove the restraint of the retainer from the washer to permit radial displacement of the discrete segments.

* * * * *